United States Patent
Yano

(10) Patent No.: US 12,429,373 B2
(45) Date of Patent: Sep. 30, 2025

(54) AQUATIC ORGANISM OBSERVATION DEVICE, AQUATIC ORGANISM OBSERVATION SYSTEM, AQUATIC ORGANISM OBSERVATION METHOD, AND RECORDING MEDIUM

(71) Applicant: NEC Corporation, Tokyo (JP)

(72) Inventor: Yutaka Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 18/019,446

(22) PCT Filed: Jun. 29, 2021

(86) PCT No.: PCT/JP2021/024445
§ 371 (c)(1),
(2) Date: Feb. 2, 2023

(87) PCT Pub. No.: WO2022/034749
PCT Pub. Date: Feb. 17, 2022

(65) Prior Publication Data
US 2023/0296427 A1    Sep. 21, 2023

(30) Foreign Application Priority Data
Aug. 12, 2020   (JP) .................................. 2020-136125

(51) Int. Cl.
*G01H 9/00*     (2006.01)
(52) U.S. Cl.
CPC .................................. *G01H 9/004* (2013.01)

(58) Field of Classification Search
CPC ............. G01H 9/004; G01H 9/00; G01S 5/22
See application file for complete search history.

(56) References Cited

U.S. PATENT DOCUMENTS

| | | | |
|---|---|---|---|
| 7,773,204 B1 * | 8/2010 | Nelson | G01S 13/48 356/5.02 |
| 10,338,253 B2 * | 7/2019 | Frijlink | G01V 1/364 |
| 10,448,152 B2 * | 10/2019 | Makris | G10L 17/26 |

(Continued)

FOREIGN PATENT DOCUMENTS

| | | |
|---|---|---|
| CN | 107665712 A | 2/2018 |
| JP | H05-509404 A | 12/1993 |

(Continued)

OTHER PUBLICATIONS

International Search Report for PCT Application No. PCT/JP2021/024445, mailed on Aug. 17, 2021.

(Continued)

*Primary Examiner* — Francis C Gray
(74) *Attorney, Agent, or Firm* — Sughrue Mion, PLLC

(57) ABSTRACT

To observe sounds produced by aquatic organisms with less effort, this aquatic organism observation device is made to include an aquatic organism information detection unit for detecting, from sound data that has been acquired using an optical fiber installed in or at the bottom of water and is related to sound at various positions on the optical fiber, a sound emitted by an aquatic organism at a sound data acquisition time and location, and an output unit for outputting aquatic organism information.

17 Claims, 9 Drawing Sheets

(56) References Cited

U.S. PATENT DOCUMENTS

| | | | |
|---|---|---|---|
| 2007/0070808 A1* | 3/2007 | Ray | G01V 1/18 367/188 |
| 2016/0170060 A1* | 6/2016 | Hopewell | G01V 1/38 367/15 |
| 2017/0142515 A1 | 5/2017 | Makris et al. | |
| 2020/0209417 A1* | 7/2020 | Englund | G01V 1/38 |
| 2023/0326309 A1* | 10/2023 | Yano | G08B 13/1672 340/541 |

FOREIGN PATENT DOCUMENTS

| | | |
|---|---|---|
| JP | 2005-134338 A | 5/2005 |
| WO | 2019/014721 A1 | 1/2019 |

OTHER PUBLICATIONS

English translation of Written opinion for PCT Application No. PCT/JP2021/024445, mailed on Aug. 17, 2021.
Akamatsu, Strategic Basic Research Programs CREST Research Area "Establishment of core technology for the preservation and regeneration of marine biodiversity and ecosystems" Research Issue "Development of remote species identification technologies for marine organisms" Research End Report, [online], [searched on Mar. 26, 2020], Internet (https://www.jst.go.jp/kisoken/crest/evaluation/shoukoku/sh_h28/JST_1111065_11103780_2016_PER.pdf).

* cited by examiner

AQUATIC ORGANISM OBSERVATION DEVICE, AQUATIC ORGANISM OBSERVATION SYSTEM, AQUATIC ORGANISM OBSERVATION METHOD, AND RECORDING MEDIUM

This application is a National Stage Entry of PCT/JP2021/024445 filed on Jun. 29, 2021, which claims priority from Japanese Patent Application 2020-136125 filed on Aug. 12, 2020, the contents of all of which are incorporated herein by reference, in their entirety.

TECHNICAL FIELD

The present invention relates to a device and the like that observe an aquatic organism.

BACKGROUND ART

In recent years, investigation of distribution of a marine organism is required, in terms of management of a fishery resource and protection of a natural environment. As a part of the investigation, a study of investigating distribution of a marine organism from a sound generated by the marine organism is advanced (e.g., see NPL 1).

In order to investigate distribution and behavior of a marine organism, it is necessary to observe a sound in the sea. As a method of observing such a sound, NPL 1 discloses a method by stationary observation and a method by mobile observation.

The method by stationary observation is, for example, a method of observing a sound by recording equipment installed at an observation point in the sea. The method by mobile observation is a method of observing a sound while towing recording equipment by a ship.

Herein, Japanese Patent Application No. 2020-013946 discloses a method of acquiring a sound around an optical fiber by distributed acoustic sensing (DAS).

CITATION LIST

Non Patent Literature

[NPL 1] Strategic Basic Research Programs CREST Research Area "Establishment of core technology for the preservation and regeneration of marine biodiversity and ecosystems" Research Issue "Development of remote species identification technologies for marine organisms" Research End Report, [online], [searched on Mar. 26, 2020], Internet (https://www.jst.go.jp/kisoken/crest/evaluation/s-houkoku/sh_h28/JST_1111065_11103780_2016_PER.pdf)

SUMMARY OF INVENTION

Technical Problem

However, in order to investigate distribution of a marine organism, it is necessary to observe a sound in the sea for a certain degree of a long period, regarding a wide range of a sea area. However, a method by stationary observation described in a paragraph of Background Art needs to install a large number of pieces of recording equipment in the sea in such a way that the recording equipment is not carried by a wave or a tide, and collect the recording equipment after recording. In this way, since the method by stationary observation requires much effort, it is difficult to maintain an observation point for a long period, and it is not easy to increase the number of observation points either. Since it is difficult to convey observation information to land in real time, and since there are restrictions of supplied power and observation data recording medium capacity, only a part of observable information can be recorded, and there is a possibility of overlooking an event.

A method by mobile observation needs to tow recording equipment over a wide range of a sea area. Thus, the method by mobile observation also requires much effort, and is not suited for long-period fixed-point observation.

An object of the present invention is to provide a means for observing an aquatic organism by use of sound that lessens effort, and enables long-period fixed-point observation over a wide range.

Solution to Problem

An aquatic organism observation device according to the present invention includes: an aquatic organism information detection unit that detects, from sound data being acquired by an optical fiber installed in water or at a bottom of water and being data relating to a sound at each position of the optical fiber, a sound emitted by an aquatic organism at a time and a place at which the sound data have been acquired; and an output unit that outputs the aquatic organism information.

Advantageous Effects of Invention

An aquatic organism observation device and the like according to the present invention provide a means for observing an aquatic organism by use of sound that lessens effort, and enables long-period fixed-point observation over a wide range.

EXAMPLE EMBODIMENT

A marine organism observation device and the like according to the present example embodiment acquires sound data for investigating distribution of a marine organism, by use of DAS described in a paragraph of Background Art, and further by use of an optical fiber provided in a submarine cable laid in the sea for another purpose such as optical transmission. Thereby, the marine organism observation device according to the present example embodiment lessens effort of observation of a sound for investigating distribution of a marine organism, and enables long-period fixed-point observation over a wide range.

Figure 1:
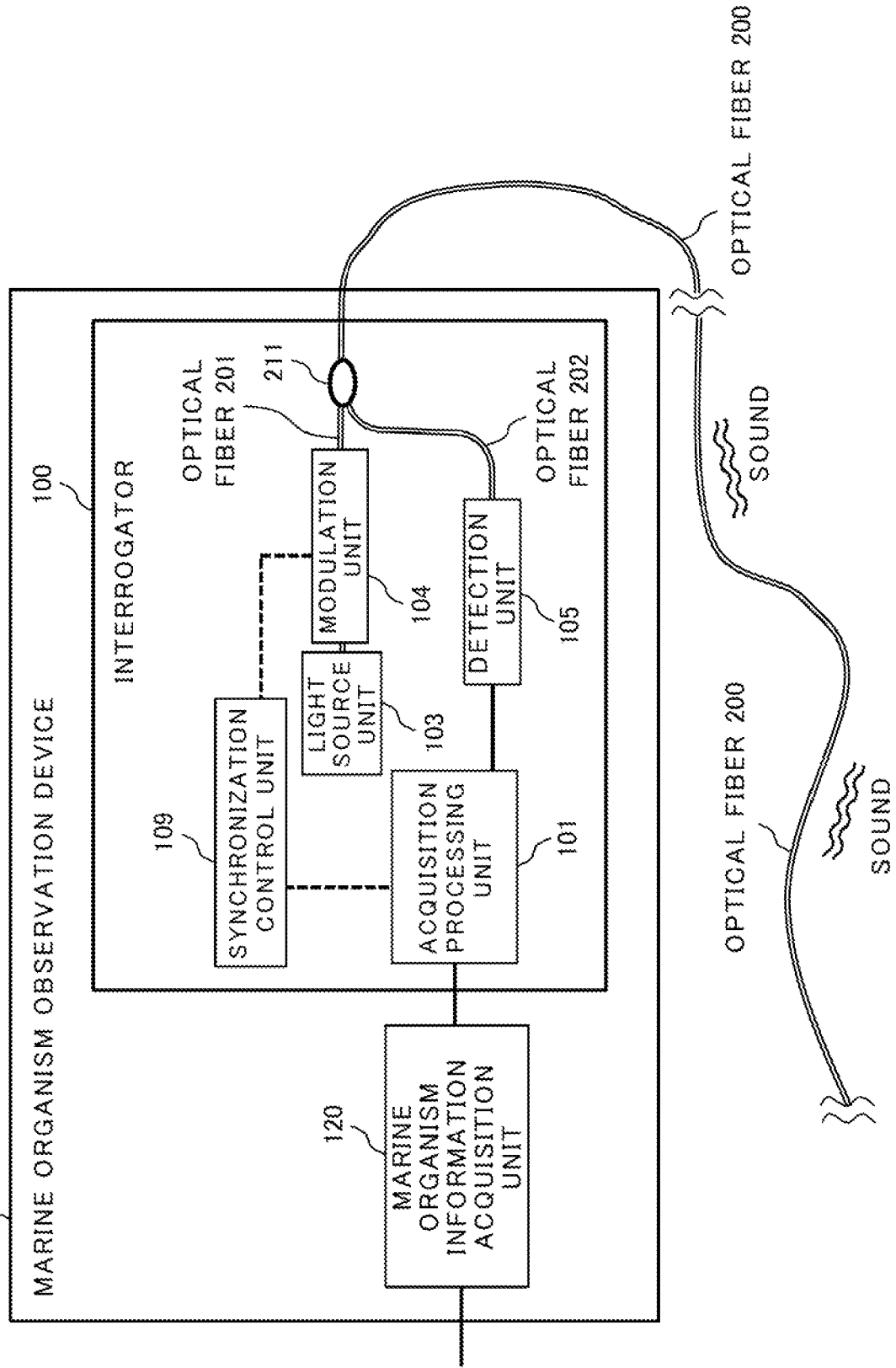
FIG. 1 is a conceptual diagram representing a configuration example of a marine organism observation system according to the present example embodiment.

FIG. 1 is a conceptual diagram representing a configuration of a marine organism observation system 300 being an example of a marine organism observation system according to the present example embodiment. The marine organism observation system 300 includes a marine organism observation device 140 and an optical fiber 200. The marine organism observation device 140 includes an interrogator 100 and a marine organism information acquisition unit 120.

Figure 2:
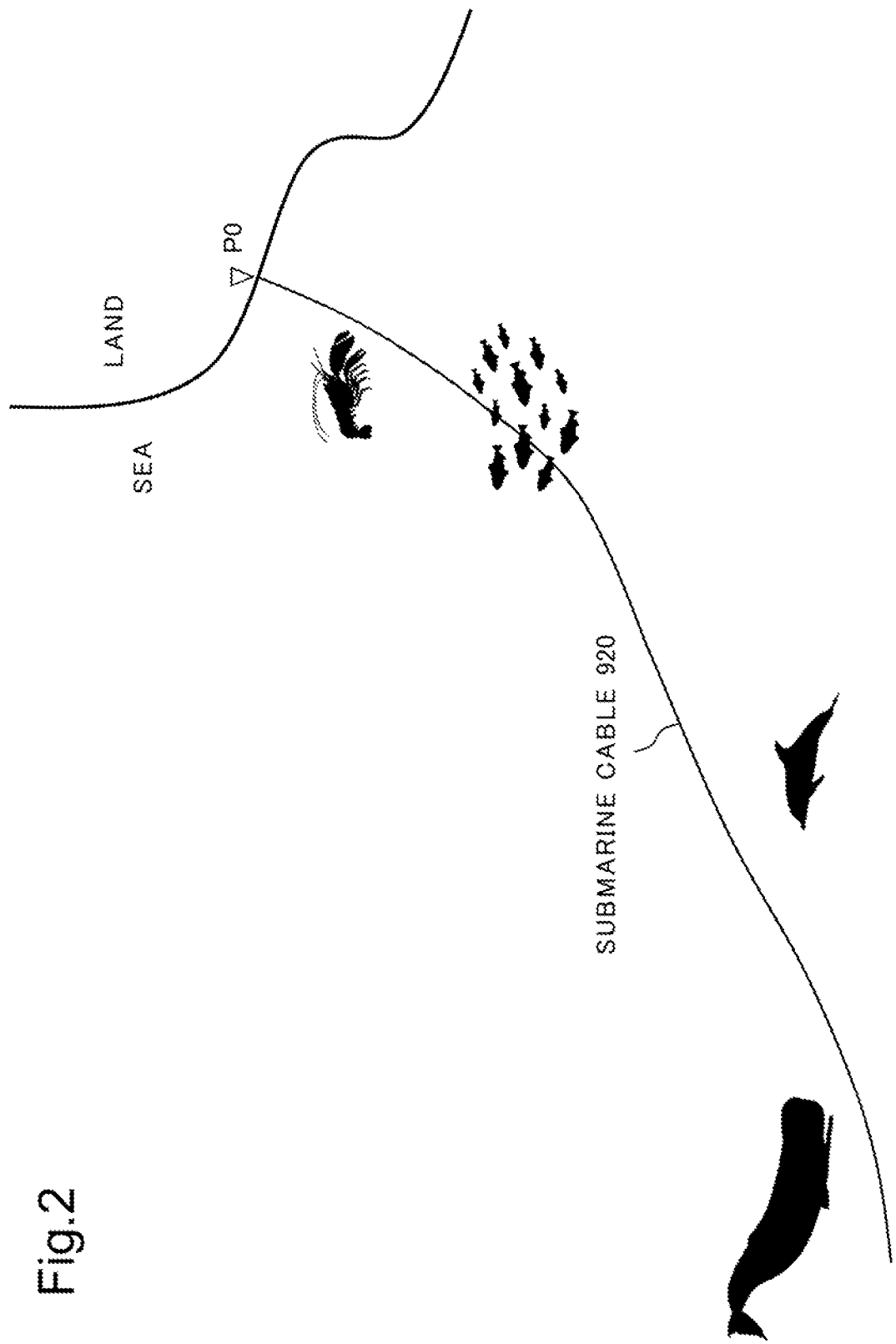
FIG. 2 is a conceptual diagram representing an example of how the marine organism observation system is installed.

FIG. 2 is a conceptual diagram representing an example of how the marine organism observation system 300 in FIG. 1 is installed.

A submarine cable 920 is, for example, a general submarine cable used for a purpose such as optical communication. The submarine cable 920 is installed offshore at the bottom of the sea or in the sea from a position P0 being a landing point.

The optical fiber 200 in FIG. 1 is one of a plurality of optical fibers included in the submarine cable 920. The optical fiber 200 may be an optical fiber used for optical communication, or may be an optical fiber used exclusively for observation of a marine organism.

The interrogator 100 in FIG. 1 is installed near the position P0, together with, for example, a device for optical communication. The marine organism information acquisition unit 120 may be installed near the interrogator 100 or may be installed away from the interrogator 100.

The interrogator may be installed on land, or may be installed on a ship such as a patrol ship. The marine organism information acquisition unit 120 is preferably put in a place where a monitoring person can receive output in real time.

The optical fiber 200 is a general optical fiber, and an optical fiber provided in a submarine cable installed for a purpose such as optical transmission other than observation of a marine organism may be utilized. A general optical fiber generates backscattering light in which a change is made due to an environment such as presence of vibration including a sound. The backscattering light typically results from Rayleigh backscattering. In this case, the change is mostly a change of a phase (phase change).

The optical fiber 200 may be an optical fiber in which a plurality of optical fibers are connected by an amplification repeater or the like. A cable including the optical fiber 200 may be connected between an optical communication device (not illustrated) including the interrogator 100 and another optical communication device.

The submarine cable 920 may also serve for another use such as optical transmission, a cable-type wave gauge, or a cable-type ocean-bottom seismometer, or may be an observation-exclusive cable for a marine organism. The submarine cable 920 includes a plurality of optical fiber core wires within a cable, varies wavelengths from each other even within the same optical fiber core wire, and thereby enables another system and the marine organism observation system according to the present example embodiment to coexist.

<Operation of the Interrogator 100>

The interrogator 100 is an interrogator for performing OTDR-type optical fiber sensing. Herein, OTDR is an abbreviation of optical time-domain reflectometry. Regarding such an interrogator, there is a description in, for example, Japanese Patent Application No. 2020-013946 described above.

The interrogator 100 includes an acquisition processing unit 101, a synchronization control unit 109, a light source unit 103, a modulation unit 104, and a detection unit 105. The modulation unit 104 is connected to the optical fiber 200 via an optical fiber 201 and an optical coupler 211, and the detection unit 105 is connected to the optical fiber 200 via the optical coupler 211 and an optical fiber 202.

The light source unit 103 includes a laser light source, and causes continuous laser light to enter the modulation unit 104.

The modulation unit 104 performs, for example, amplitude modulation of laser light of continuous light that has been caused to enter from the light source unit 103, synchronously with a trigger signal from the synchronization control unit 109, and generates probe light of a sensing signal wavelength. The probe light is, for example, pulsed. Then, the modulation unit 104 sends the probe light to the optical fiber 200 via the optical fiber 201 and the optical coupler 211.

The synchronization control unit 109 also sends a trigger signal to the acquisition processing unit 101, and communicates which part of continuously analog/digital (A/D)-converted and input data is a time origin.

When the sending of the probe light is performed, return light from each position of the optical fiber 200 reaches the detection unit 105 from the optical coupler 211 via the optical fiber 202. Return light from each position of the optical fiber reaches the interrogator 100 in a shorter time after sending of probe light is performed, as the position is closer to the interrogator 100. Then, when a certain position of the optical fiber 200 is influenced by an environment such as presence of a sound, a change from probe light at sending is generated, by the environment, in backscattering light generated at the position. When backscattering light is Rayleigh backscattering light, the change is mostly a phase change.

Return light in which the phase change is generated is detected by the detection unit 105. For a method of the detection, synchronous detection and delay detection are known, and either method may be used. Since a configuration for performing phase detection is known, description thereof is omitted herein. An electric signal (detection signal) acquired by detection represents a degree of a phase change by amplitude or the like. The electric signal is input to the acquisition processing unit 101.

The acquisition processing unit 101 first A/D-converts the electric signal described above into digital data. Then, a phase change from a previous measurement, of light that has been scattered at each point of the optical fiber 200 and has returned is derived in a form of, for example, a difference from the previous measurement at the same point. Since the signal processing is a general technique of DAS, detailed description thereof is omitted.

The acquisition processing unit 101 derives data in a form similar to that acquired by virtually arranging a string of dotted electric sensors, at each sensor position of the optical fiber 200. The data are virtual sensor array output data acquired as a result of signal processing, but are hereinafter referred to as RAW data for simplification of description. RAW data are data representing instantaneous intensity (waveform) of a sound detected by an optical fiber at each time and at each point (sensor position) of the optical fiber 200. Regarding RAW data, there is description in, for example, a paragraph of Background Art of Japanese Patent Application No. 2020-013946 described above. The acquisition processing unit 101 outputs the RAW data to the marine organism information acquisition unit 120.

<Operation of the Marine Organism Information Acquisition Unit 120>

The marine organism information acquisition unit 120 derives organism sound detection information being information representing when, at which position of the optical fiber 200, and in what kind of marine organism a sound is detected from the RAW data input from the acquisition processing unit 101. A configuration of the marine organism information acquisition unit 120 is described with reference to FIG. 3. Details of an operation are described later with reference to FIGS. 4 to 8.

Figure 3:
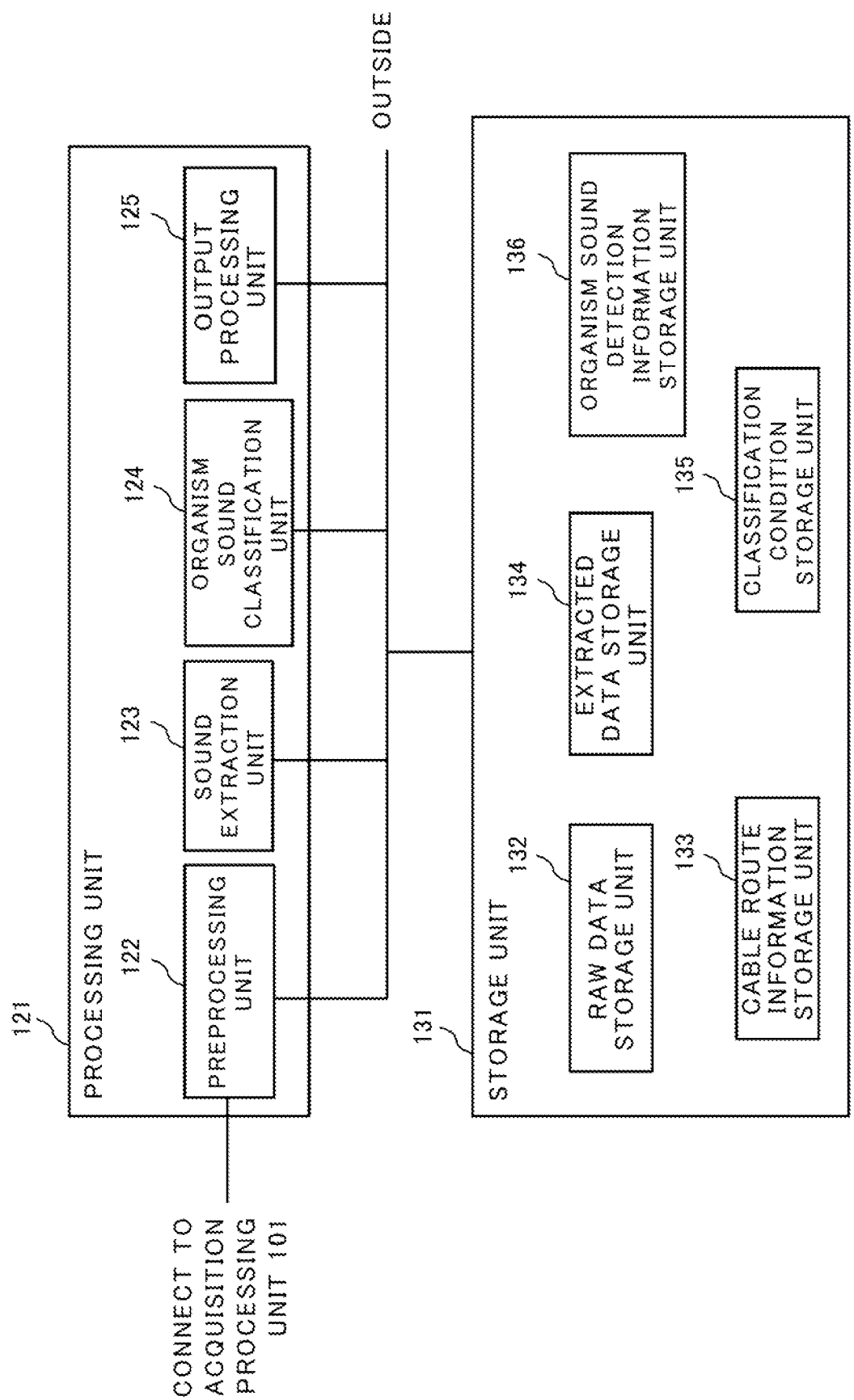
FIG. 3 is a conceptual diagram representing a configuration example of a marine organism information acquisition unit.

FIG. 3 is a conceptual diagram representing a configuration example of the marine organism information acquisition unit 120 in FIG. 1. The marine organism information acquisition unit 120 includes a processing unit 121 and a storage unit 131.

The processing unit 121 includes a preprocessing unit 122, a sound extraction unit 123, an organism sound classification unit 124, and an output processing unit 125. The storage unit 131 includes a RAW data storage unit 132, a cable route information storage unit 133, an extracted data storage unit 134, a classification condition storage unit 135, and an organism sound detection information storage unit 136.

The RAW data described above are input to the preprocessing unit 122 from the acquisition processing unit 101 in FIG. 1. The RAW data are data representing instantaneous intensity (waveform) of a sound transmitted to an optical fiber at each time and at each measurement point (sensor position) of the optical fiber 200, as described above.

In the preprocessing unit 122, a geographic coordinate is given to RAW data for each measurement point. At a phase of RAW data, position information of each measurement point is expressed by a position on a cable (e.g., a distance from a cable end). Meanwhile, data on a geographic coordinate where a cable is installed are stored in the cable route information storage unit 133. Since a geographic coordinate of each point of a cable is previously derived by collating the two, and previously stored in the cable route information storage unit 133, the geographic coordinate is given to the RAW data. The preprocessed RAW data are stored in the RAW data storage unit 132.

The sound extraction unit 123 extracts, by, for example, input of start information from outside, sound data with a possibility of having been generated by an organism, regarding RAW data in a predetermined time range and a distance range, and stores the sound data in the extracted data storage unit 134. Thereby, since a data part in which no possibility of an organism sound is seen is excluded, and a total data amount is significantly reduced, a load of subsequent data processing is reduced.

The organism sound classification unit 124 classifies a sound of a marine organism from each piece of extracted data stored in the extracted data storage unit 134. The organism sound classification unit 124 performs the classification by a classification condition previously stored in the classification condition storage unit 135. Herein, the classification condition is information combining a kind of sound (generation cause ID) and information characteristically seen in the sound. Herein, the kind of sound is information such as a kind of marine organism, at which time a sound is generated, whether a sound is a sound that needs to be subjected to same sound integration processing described later, or whether a sound is a sound that needs to be subjected to tracking processing of a moving sound source described later. The organism sound classification unit 124 stores a classification result of a sound in the organism sound detection information storage unit 136.

The organism sound classification unit 124 performs the classification processing described above, by, for example, collating extracted data with the classification condition by analogical determination.

The classification condition described above is, for example, information relating to a frequency of a detected sound. A sound generated by a marine organism in the sea may have a specific frequency, and, in this case, a kind of marine organism and behavior thereof are classifiable from the frequency of the sound. As information relating to a frequency, for example, a center frequency and a frequency band are assumed. For example, it is known that a frequency band of a sound generated by an Indian porpoise or a common porpoise is fixed, and each of the kinds is classifiable from the frequency band of the sound.

Alternatively, the classification condition described above is, for example, an interval of a sound. Some kind of marine organism, such as a sperm whale, may generate a sound at a certain degree of fixed interval. In this case, the kind of marine organism is classifiable by using the interval of the sound.

Alternatively, the classification condition described above is, for example, a pattern of a sound representing temporal transition of a frequency band of the sound. More accurate classification of a marine organism becomes possible by using the pattern of the sound.

The output processing unit 125 reads organism sound detection information in a predetermined time range and a sensor position range from the organism sound detection information storage unit 136 according to, for example, instruction information from outside, and outputs the organism sound detection information. An output destination related to the output is, for example, an outside display, printer, or communication device.

Further, the present device may include the following processing and function. For example, the processing is mapping visualization processing combined with map information. The present method has a real-time characteristic, and can therefore contribute to working efficiency improvement of an ecological survey, when a place where an organism appears is directly transmitted in a form of a figure to a survey ship on the sea.

The function is, for example, a function of accumulating a past history in a database. Visualization of a seasonal trend of a specific organism distribution, or the like becomes possible by analyzing a history.

Herein, as information to be accumulated in a database, not only organism sound detection information but also another piece of information may be saved. The another piece of information is utilizable, for example, in such a case that a detailed analysis is desired later (offline). When sound data that do not match the classification condition and are not allowed to be classified are also saved, the sound data can also serve, by being analyzed, as source information for preparing a sound emitted by a new organism as a classification condition. Data to be saved are preferably retained in such a way that such detailed setting or an operation according to use or status is possible.

<Data Processing Performed by the Marine Organism Information Acquisition Unit 120>

Figure 4:
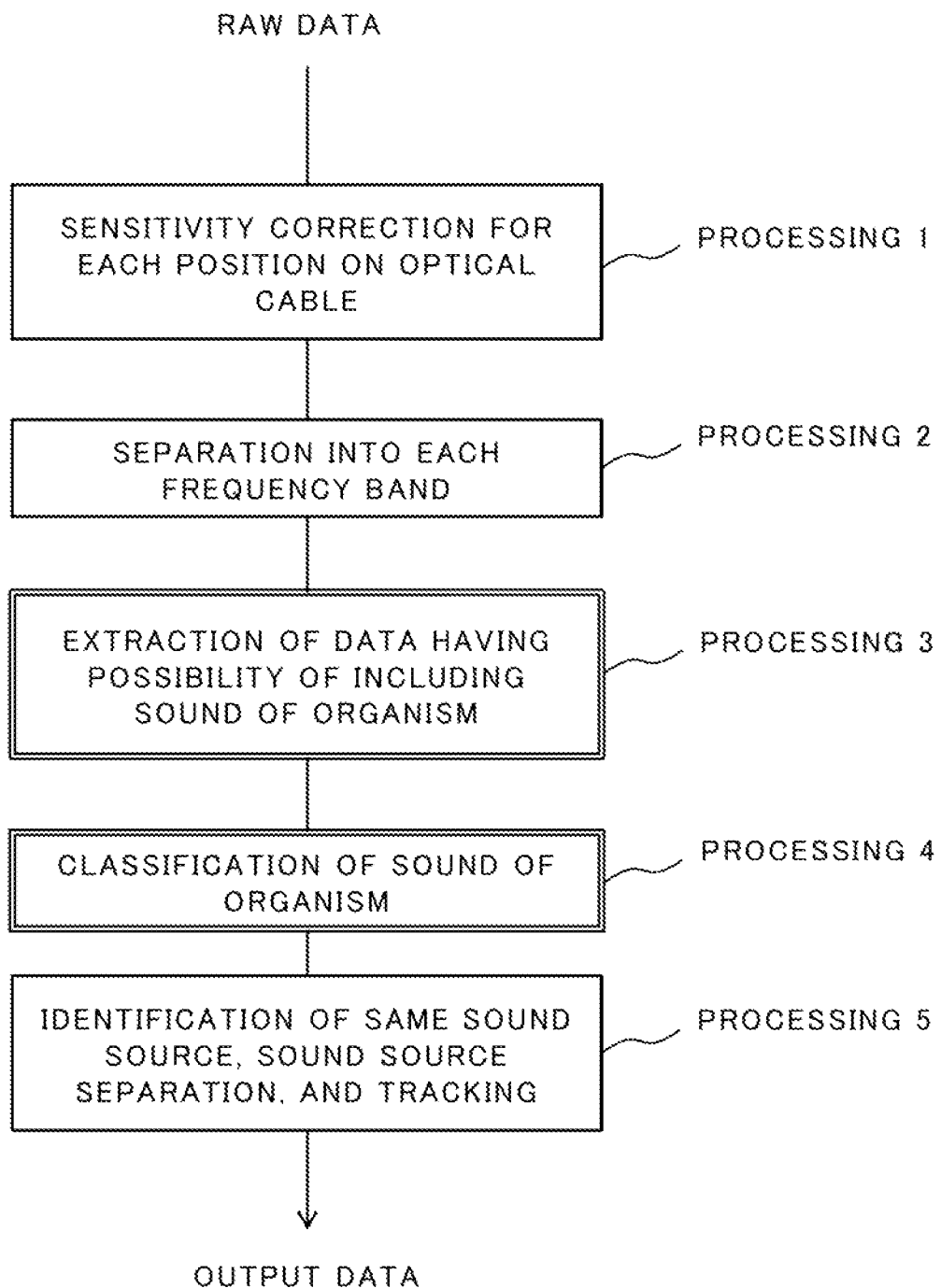
FIG. 4 is a diagram describing an outline of a processing content of the marine organism information acquisition unit.

FIG. 4 is a conceptual diagram representing a data processing example of analysis and evaluation of sound data performed by the marine organism information acquisition unit 120. Among Processing 1 to Processing 5, Processing 4 is considered to be performed in most application scenes, and other pieces of processing are pieces of processing for analysis performance improvement of a sound, and may be therefore not implemented. When certain processing is not implemented, data processed in previous processing directly become processing target data of next processing.

The RAW data described above are input to the marine organism information acquisition unit 120 from the acquisition processing unit 101 in FIG. 1. The RAW data are data representing instantaneous intensity (waveform) of a sound detected by an optical fiber at each time and at each measurement point (sensor position) of the optical fiber 200, as described above.

<Processing 1: Sensitivity Correction for Each Position on an Optical Cable>

Whether to implement Processing 1 is selected by application status of the marine organism observation device 140 in FIG. 1. When implemented, Processing 1 is implemented in, for example, the preprocessing unit 122.

A configurational characteristic of the present application is that an underwater microphone or an underwater device is unnecessary because a cable itself is used as a sensor (underwater microphone). Thereby, an increase of cost due to an increase in the number of devices according to the number of observation points can be avoided, and assurance of long-term reliability becomes easy because no electronic circuit is required under water. Meanwhile, a property as a sensor is not a calibrated property as in an underwater microphone, and there is a problem of exercise of a transfer function (filtering function) such as attenuation or enhancement of intensity of a specific frequency band. Further, there is a problem that the transfer function differs depending on a kind of cable, installation status, or the like. The problems are preferably corrected for classification of a sound described later.

[Nonuniformity of a Sensor Property: Difference of Cable Kind or the Like and Correction]

The submarine cable 920 that acquires environment information differs in a kind of cable and an installation method depending on an installation place. Thereby, a property of the submarine cable 920 as a sensor differs for each place.

Herein, a difference of a cable kind is, for example, a difference of a cross-sectional structure resulting from use for power transmission, communication, or the like, a difference of a structure of a protection cover (presence or absence of an armoring wire and a kind thereof), or the like. A difference of an installation method is, for example, a difference of a method in which a cable is merely placed on a surface of sea bottom, a method in which a ditch is dug in the sea bottom and a cable is buried therein, and the like.

A difference of transfer functions of the cables for each place is recognized by referring to a manufacture record or a construction record, and the records are recorded in, for example, the cable route information storage unit 133. The difference of transfer functions due to the difference can be substantially uniquely corrected for each place of the submarine cable 920. A specific correction method is, for example, increasing amplitude of a specific frequency band by a filter.

Herein, the difference of transfer functions due to a cable kind and a kind of method is preferably recognized by previously performing an experiment, and performing a comparison with, as a criterion, sound data acquired by, for example, an underwater microphone.

Note that, a correction to the difference is not necessarily made on an acquisition data side, and a method in which a correction is made on a classification condition side described later can also be conceived. For example, with a property of attenuating on a high-frequency side of environment information due to a structure of a cable, correction of acquisition data is not performed, and it becomes easy to acquire correspondence of pattern identification by attenuating a high-frequency side of a classification condition according to a cable kind at an acquisition position. However, generally, correction of an acquisition data side has an advantage such as an increase in versatility of data utilization, and is considered preferable.

[Nonuniformity of a Sensor Property: Difference of Each Site and Calibration]

A factor of a variation of a sensor property at each measurement point of the laid submarine cable 920 is not only a factor that is determined (can be estimated) uniquely from the construction record or the like described above. For example, it is because, even when a record of embedding at a uniform depth exists, embedding depth may actually vary from place to place, or covering earth and sand may be partly carried away and results in exposure of the cable.

For the problem, a method of calibration by utilizing, as a reference sound, a sound transmitting to a site in a wide range can be conceived. For the reference sound, not only an artificial sound but also naturally generated sound may be utilized. For example, utilization of a sound of a marine organism, such as a whale, the characteristic of a generated sound of which is well known can be conceived. In a case of a sound transmitting in a wide range, nearly the same sound is sensed at each point on the submarine cable 920, and, therefore, the marine organism information acquisition unit 120 derives a correction coefficient for each point in such a way that the sounds approximate the same, or approximate a value according to a distance from a sound source.

By the calibration, whether each point on the submarine cable 920 is suited to acquisition of a sound generated by a marine organism can also be recognized. For example, a certain point is very low in sensitivity and may not be completely corrected, and another certain point easily resonates on a specific frequency band and is difficult to correct, and the like. The points having some difficulty in environment acquisition can be extracted, for example, by comparing, regarding precedent and subsequent measurement points on a cable, intensity of a sound with a movement average value thereof. Hence, accuracy of observation can be improved by excluding the point having difficulty with distribution of an observation point in mind, and utilizing data from a point that seems to have allowed acquisition of nearly average environment information.

<Processing 2: Separation into Each Frequency Band>

Whether to implement Processing 2 is selected by application status of the marine organism observation device 140. When implemented, Processing 2 is implemented in, for example, the preprocessing unit 122.

Herein, separation for each frequency band is separating sound data for each frequency band, in such a way as, for example, an extremely low frequency to 0.1 Hz, 0.1 to 1 Hz, 1 to 10 Hz, 10 to 100 Hz, and equal to or more than 100 Hz. The setting of a frequency band is preferably performed in such a way as to be approximately classified by a range of a sound emitted by a marine organism.

There are broadly two reasons for evaluating sound data separately for each frequency band. One is that a frequency band of a sound generated by a marine organism is approximately classified by a kind of organism. It becomes easy to perform analogical determination in classification processing described later, by separating for each frequency band.

Another is for removal of data other than organism-derived sound data. For example, in a place where a sound other than an organism-derived sound is loud, such as a place where a wave dashes against a shore, sound data are separated for each frequency band, and classification processing described later is performed on a frequency band on which a sound other than an organism-derived sound is not loud, and a sound emitted by an organism is comparatively loud. In this case, an influence of a sound other than an organism-derived sound on evaluation of an organism-derived sound can be reduced.

For such a reason, sound data are separately evaluated for each frequency band.

<Processing 3: Extraction of Data Having a Possibility of Including a Sound of an Organism>

Whether to implement Processing 3 is selected by application status of the marine organism observation device 140. When implemented, Processing 3 is implemented in, for example, the sound extraction unit 123. A method of the extraction is, for example, extracting, by threshold value excess determination, a rapid change of intensity of sound data from a movement average trend up to a most recent point.

Thereby, data in which no possibility of an organism sound is seen is excluded, and a data amount that is to be processed later is reduced.

<Processing 4: Classification of a Sound of an Organism>

Processing 4 is processing implemented in many cases. Processing 4 is implemented in the organism sound classification unit 124.

Herein, processing of automatically identifying a kind of organism and behavior thereof is described. As introduced in NPL 1, a technique of automatically identifying a kind of organism and behavior thereof from a sound extracted with an underwater microphone is actively studied and developed. The marine organism observation device 140 performs similar processing regarding a sound extracted by optical fiber sensing. Details are described later.

<Processing 5: Identification of the Same Sound Source, Sound Source Separation, and Tracking>

Whether to implement Processing 5 is selected by application status of the marine organism observation device 140. When implemented, Processing 5 is implemented in, for example, the organism sound classification unit 124.

A sound generated in a place being separate from an optical cable concentrically or spherically may spread, and be detected in a plurality of places of the optical cable. Hence, the organism sound classification unit 124 further analyzes a geographic coordinate of a measurement point where a similar sound is detected, and time information, and thereby estimates and identifies that the sounds are sounds emitted from one sound source.

Furthermore, there is also a case where a plurality of sounds are generated in a range being close in distance and time, and the sounds are detected in a plurality of places of an optical cable. In this case, the marine organism information acquisition unit 120 in FIG. 1 can separate and individually recognize the plurality of sounds, by mainly using the following two techniques.

Part 1. When characteristics of sounds differ from each other, the sounds can be separated and identified by the method described in Processing 4, even when the sounds are observed in such a way as to partly overlap in time.

Part 2. A plurality of sound sources differing in position from each other can be separated and identified by use of a known sound source separation technique, even when the sound sources are observed in such a way as to overlap in time. This is a merit specific to the marine organism observation system 300 in FIG. 1 that a long optical fiber itself can be utilized as a sensor array.

Regarding the operation described above, one example is cited. It is assumed that a whale has given a cry in a place being slightly away from an optical cable. The sound spreads in water, and transmits to a plurality of parts on the optical cable. It is assumed that the organism sound classification unit 124 is previously provided with characteristic amounts of cries of various whales as classification conditions. Then, it is assumed that the organism sound classification unit 124 detects presence of a sound being similar to a characteristic of a cry of a whale in a plurality of parts on the optical cable. In this case, the organism sound classification unit 124 estimates and identifies, from detection intensity of the sound, and a coordinate position and a time of the detection, that the sounds are one cry given by one whale. (An example of Part 1 described above).

Furthermore, it is assumed that one ship sails, and an engine sound thereof transmits to a plurality of parts on the optical cable simultaneously with a cry of a whale. In this case, the organism sound classification unit 124 distinguishes between two sounds from a characteristic difference of the sounds, and also identifies one cry of one whale (An example of Part 1 described above).

Furthermore, it is assumed that a plurality of whales give cries in differing places in such a way as to overlap in time, and the cries transmit to a plurality of parts of an optical cable. The organism sound classification unit 124 identifies, from characteristics thereof, that sounds identified as cries of whales and detected in a plurality of parts of the optical cable are sounds generated by a plurality of sound sources in spatially differing places, by applying a sound source separation technique, for example, a beam forming technique. (An example of Part 2 described above).

In this way, one sound is detected in a plurality of parts on an optical cable and the sound needs to be identified as one sound, when a sound source is present in a place being away from the optical cable and a distance between sound sources is sufficiently greater than a spatial resolution of optical fiber sensing. An opposite example is a sound generated by a pistol shrimp. Pistol shrimps are large in the number of individuals and small in size, and it is difficult to identify each single sound generated by each individual. The organism sound classification unit 124 identifies such a sound as a sound emitted by a "school" in a classification condition, and does not perform identification processing of the same sound for each individual.

Information about whether identification processing of the same sound is to be performed may be previously included in a classification condition. For example, when a characteristic of a cry of a whale is detected, the organism sound classification unit 124 performs processing of identifying the same sound source, in such a way that the number of individuals is not erroneously measured to be large. Alternatively, when a characteristic of a sound emitted by a pistol shrimp is detected, the organism sound classification unit 124 does not perform processing of identifying the same sound source.

<Processing 5: Identification of the Same Sound Source, Sound Source Separation, and Tracking>

Furthermore, when a sound source moves, a model in which an object emitting a sound moves can be applied by continuously performing the estimation and identification, and recognition of a speed and a travel direction of the sound source, and prediction of a position (place) of a marine organism a little ahead become possible.

As one example, a cry of a whale is considered. When the whale continuously or intermittently gives a cry while moving, the cry of the whale is kept detected. Herein, by applying to a model of an object moving within a space, a speed and a travel direction of the whale are approximately recognized, and a place that may be detected next can be approximately expected. In a case of applying to a model of a moving object, there is a high possibility that a cry of the same individual is detected again, and, therefore, reliability of detection and classification may be increased by lowering or the like of a detection threshold value of a sound of the kind. In this case, inspecting, in more detail spatially and temporally, a place expected to be detected next, or the like becomes possible. By using a capability of an optical fiber as a sensor array, for example, a known beam forming technique herein as well, tracking of a moving sound source can be made easy. Note that, a merit of the marine organism observation system 300 in FIG. 1 is that all pieces of information sensed by an optical fiber are sent, at any time, to the marine organism observation device 140 including a large-capacity storage device and a processing device, through the optical fiber 200. Therefore, the marine organism information acquisition unit 120 is also capable of taking advantage of the merit, and performing tracking of a target of attention after recorded data.

<Details of Processing 4: Classification Method of a Sound Emitted by an Organism>

There are roughly two methods of classification processing performed by the organism sound classification unit 124. One is a method, called a voiceprint identification technique, that previously finds out an identification condition made up of a combination of a plurality of conditions of characteristic amounts for differentiating a kind of organism and behavior thereof, and determines by the identification condition. A specific example of the method is described later. Another is a method, called machine learning, particularly, deep learning, that inputs, to a multilayer hierarchical neural network, a large number of pieces of labeled data indicating what it is, causes the multilayer hierarchical neural network to learn the data, acquires a learned model, and uses the model for identification. The identification techniques are one example, and may be used in combination, or a newly developed analysis method may be used.

An example described next is an example of the former method that identifies by use of a classification condition, i.e., an identification condition made up of a combination of a plurality of conditions of characteristic amounts. While a classification condition is unnecessary in a method using a learned model, specific description is omitted herein, and four specific examples are described regarding a method of performing analogical determination using a classification condition. The examples are some examples of a process of analogical determination, and not all of the examples are described.

A first specific example of a classification operation of the organism sound classification unit 124 is described.

It is assumed that the classification condition storage unit 135 stores "when a frequency of a sound is within an allowable range ±B [Hz] around AAA [Hz], the sound is a cry of a marine organism CCC." as a classification condition. Herein, it is assumed that the value B is a value sufficiently smaller as compared with the value AAA.

Herein, it is assumed that a frequency of a sound included in extracted data read from the extracted data storage unit 134 is within AAA±B [Hz]. In this case, the organism sound classification unit 124 classifies that a sound included in the extracted data is a cry of the marine organism CCC, and stores a classification result in the organism sound detection information storage unit 136.

A second specific example of a classification operation of the organism sound classification unit 124 is described.

It is assumed that the classification condition storage unit 135 stores "when a temporal interval of a sound is within an allowable range ±E seconds around DDD seconds, the sound is a cry of the marine organism CCC." as a classification condition. Herein, it is assumed that the value E is a value sufficiently smaller as compared with the value DDD.

Herein, it is assumed that a temporal interval of a sound included in extracted data read from the extracted data storage unit 134 is within DDD±E seconds. In this case, the organism sound classification unit 124 classifies that a sound included in the extracted data is a cry of the marine organism CCC, and stores a classification result in the organism sound detection information storage unit 136.

A third specific example of a classification operation of the organism sound classification unit 124 is described with reference to FIGS. 5 and 6.

Figure 5:
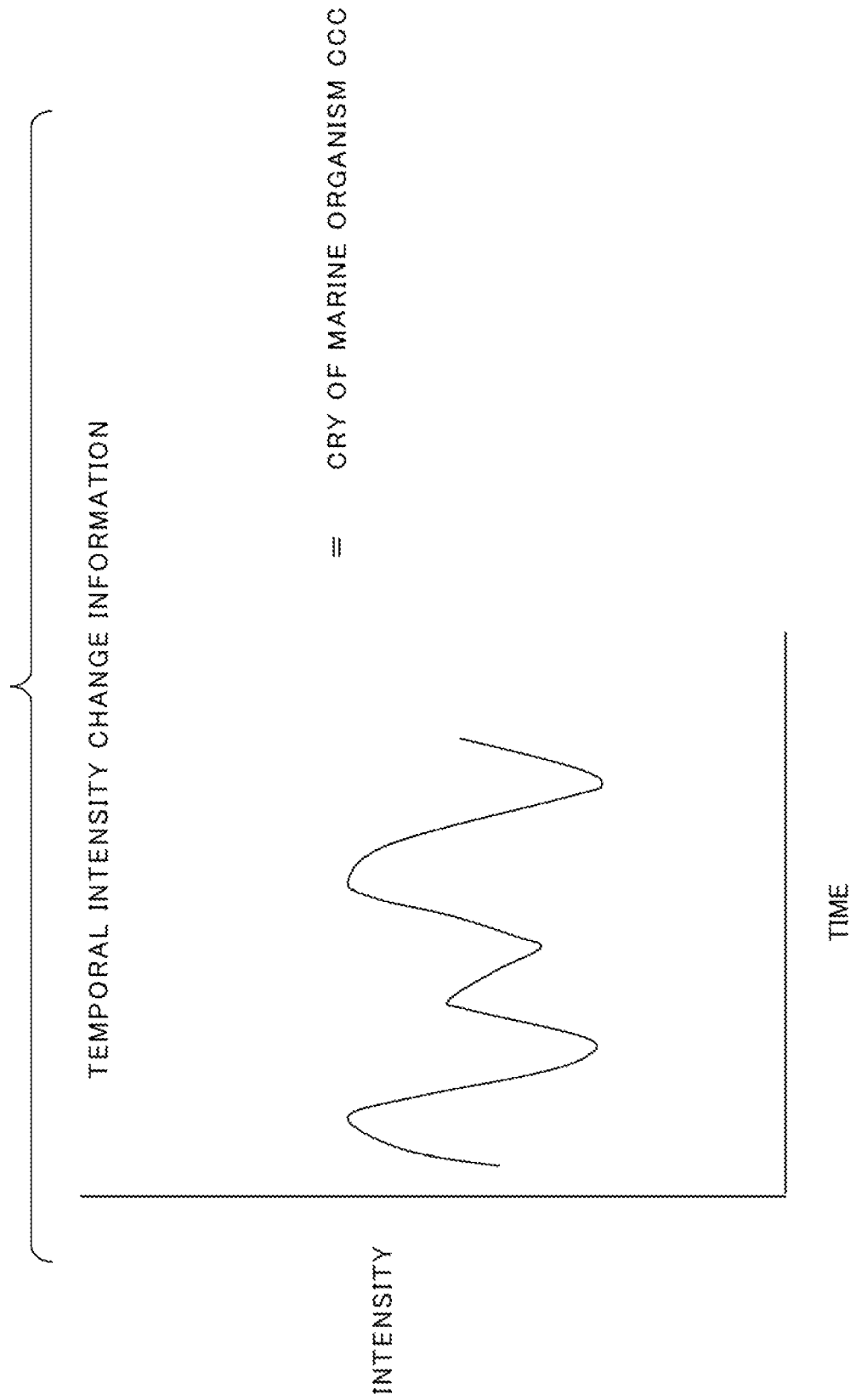
FIG. 5 is a conceptual diagram (part 1) representing a third specific example of an operation performed by an organism sound classification unit.

Herein, it is assumed that the classification condition storage unit 135 stores "a temporal change pattern of intensity of a sound represented in FIG. 5 is a cry of the marine organism CCC." as a classification condition.

Figure 6:
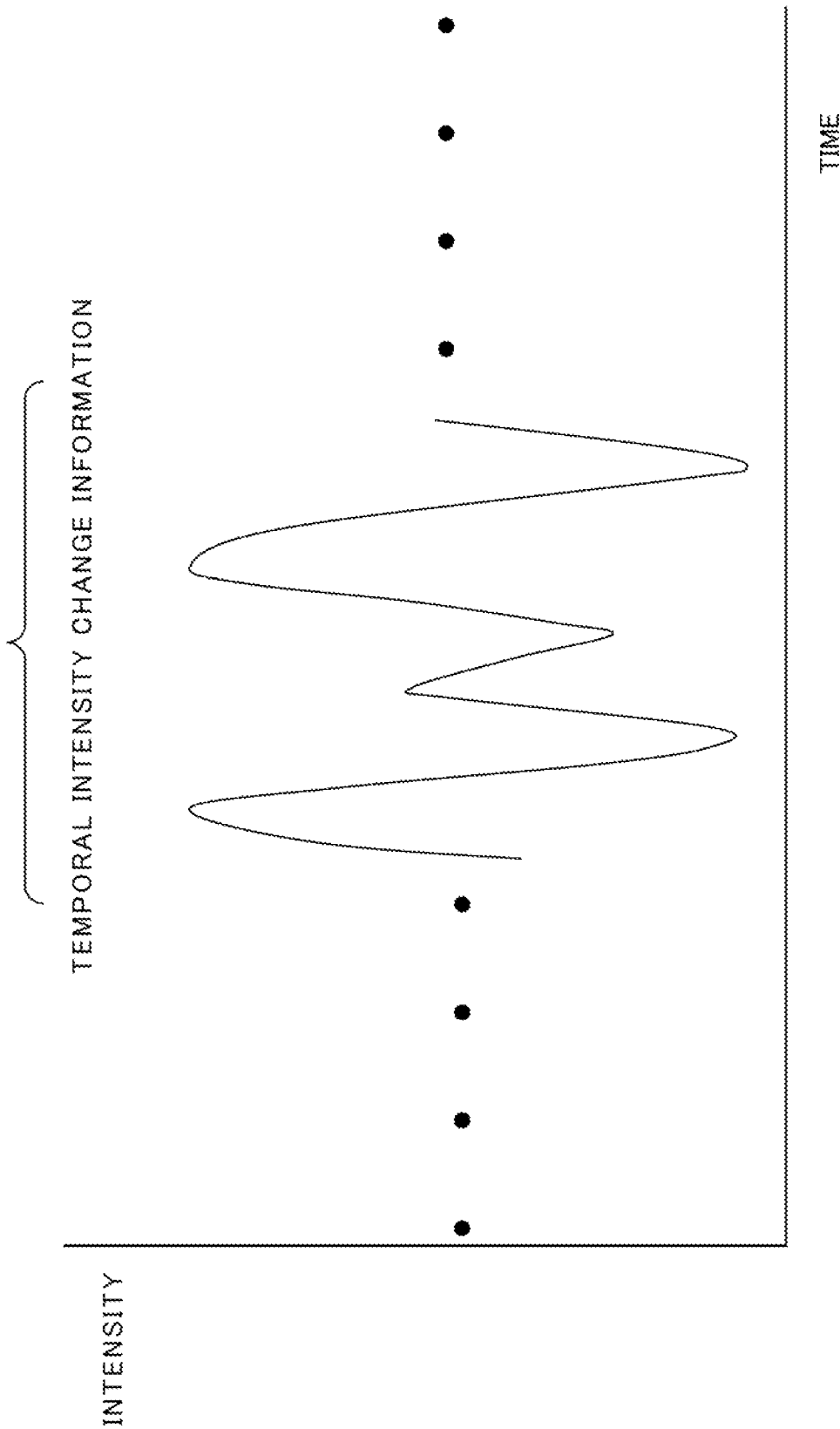
FIG. 6 is a conceptual diagram (part 2) representing the third specific example of an operation performed by the organism sound classification unit.

Herein, it is assumed that there is, in extracted data read from the extracted data storage unit 134, a period including a temporal intensity change in FIG. 6. The organism sound classification unit 124 performs analogical determination of a pattern of a temporal intensity change in FIG. 5 and a waveform of the extracted data, and determines that the pattern in FIG. 5 being a classification condition exists in the extracted data in a form of FIG. 6 with a strong correlation. The organism sound classification unit 124 performs the determination processing by, for example, calculation of a general cross-correlation coefficient. Then, the organism sound classification unit 124 classifies that a sound included in the extracted data is a cry of the marine organism CCC, and stores a classification result in the organism sound detection information storage unit 136.

A fourth specific example of a classification operation of the organism sound classification unit 124 is described with reference to FIGS. 7 and 8.

Figure 7:
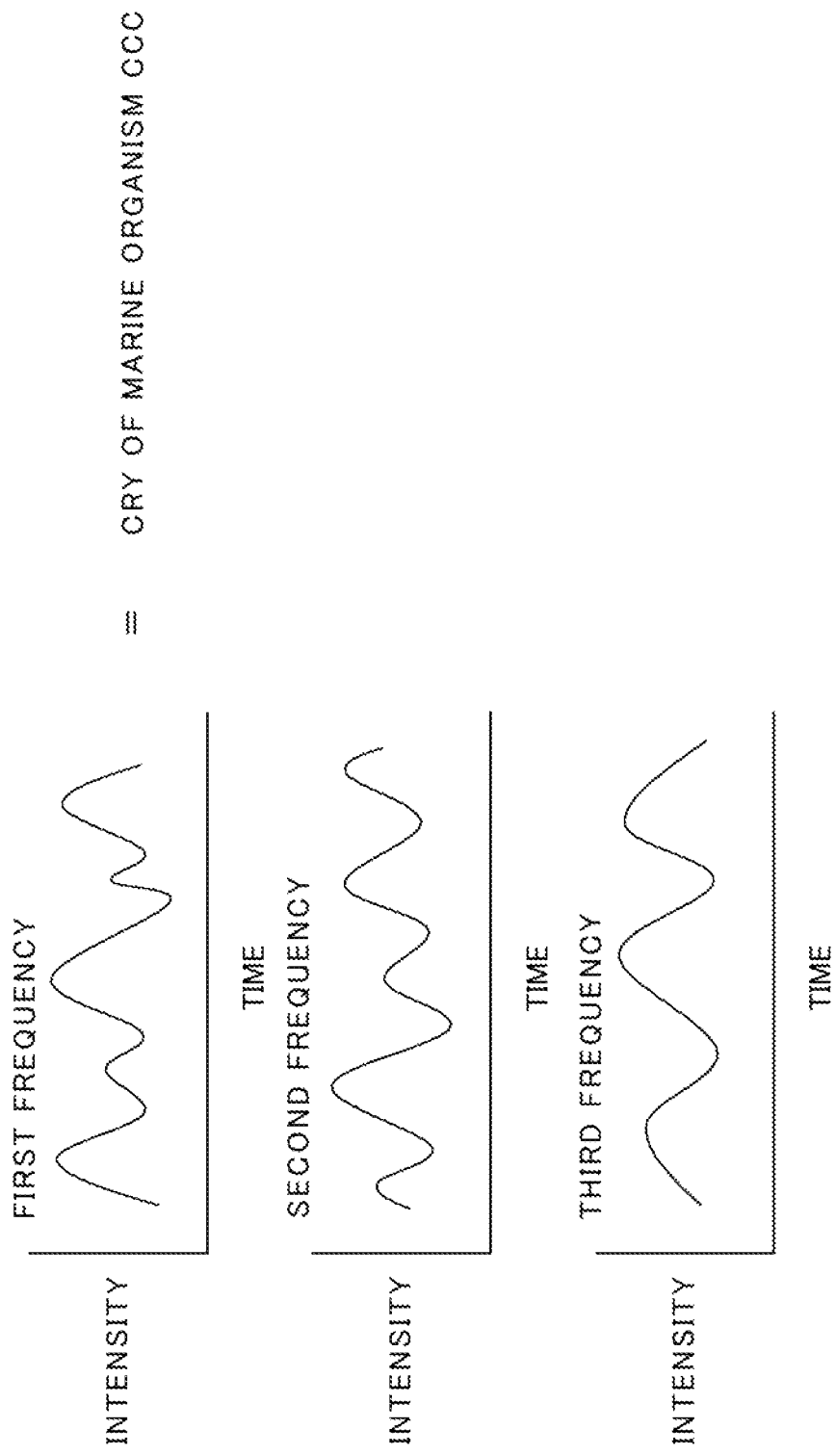
FIG. 7 is a conceptual diagram (part 1) representing a fourth specific example of an operation performed by the organism sound classification unit.

Herein, it is assumed that the classification condition storage unit 135 stores "a pattern of temporal change information of intensity of a sound regarding a plurality of frequencies (temporal intensity change information of a plurality of frequencies) represented in FIG. 7 is a cry of the marine organism CCC." as a classification condition.

Figure 8:
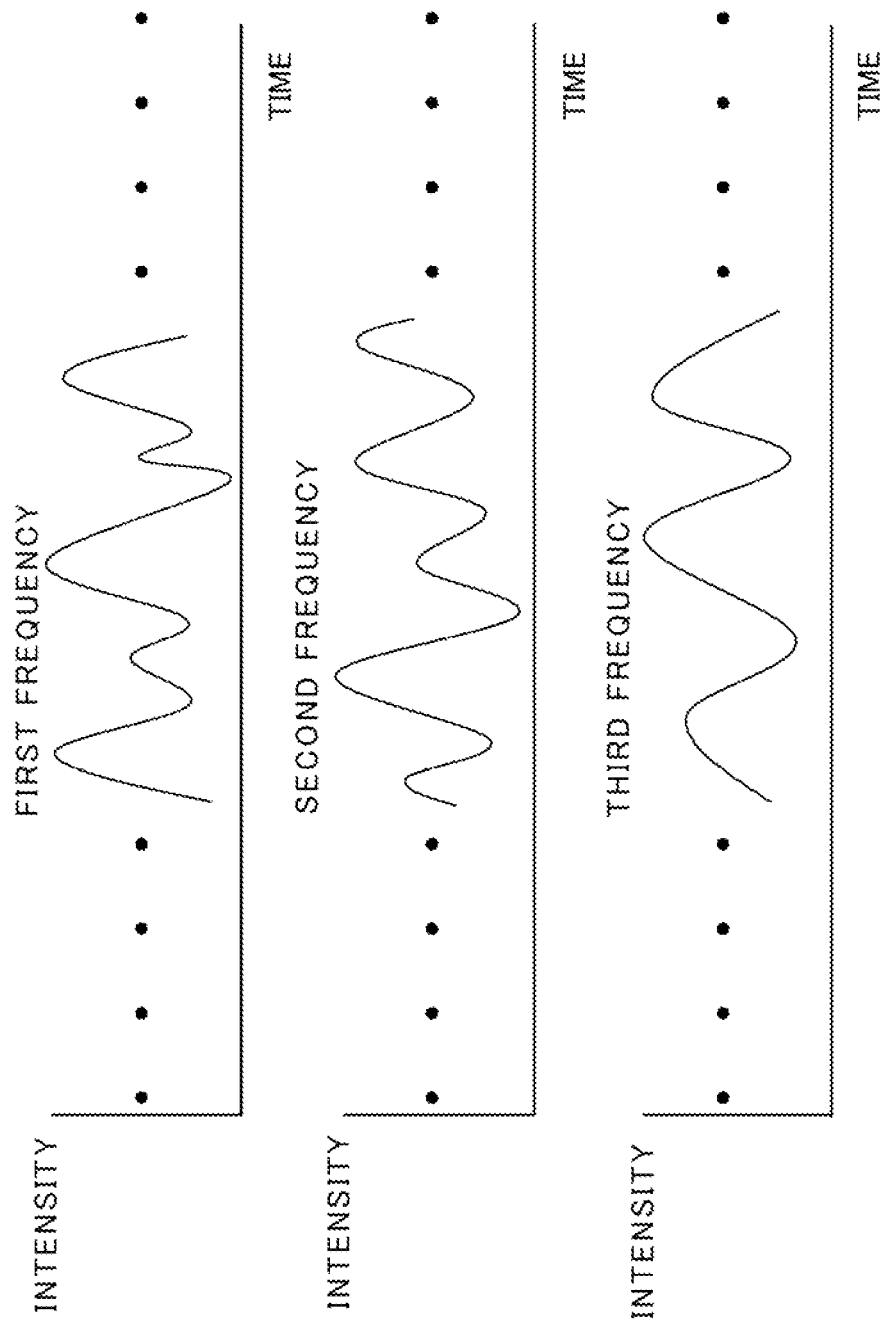
FIG. 8 is a conceptual diagram (part 2) representing the fourth specific example of an operation performed by the organism sound classification unit.

Herein, it is assumed that there is, in extracted data read from the extracted data storage unit 134, a period including the temporal intensity change information of a plurality of frequencies in FIG. 8. The organism sound classification unit 124 performs analogical determination of a pattern of temporal intensity change information of a plurality of frequencies in FIG. 7 and the extracted data, and determines that the pattern in FIG. 7 being a classification condition exists in the extracted data in a form of FIG. 8 with a strong correlation. The organism sound classification unit 124 performs the determination processing by, for example, calculation of a general cross-correlation coefficient. Then, the organism sound classification unit 124 classifies that a sound included in the extracted data is a cry of the marine organism CCC, and stores a classification result in the organism sound detection information storage unit 136.

Advantageous Effect

The marine organism observation device according to the present example embodiment performs observation of a marine organism by an optical fiber sensing technique, by use of an optical fiber included within an optical cable installed in the sea or at the bottom of the sea. Thus, there is no need to install or collect recording equipment in the sea, or tow recording equipment over a wide range of a sea area for a long period. The marine organism observation device according to the present example embodiment is able to transmit observation information to land in real time. Thereby, the marine organism observation device according to the present example embodiment lessens effort of observation of a sound for investigating a marine organism, and enables fixed-point observation with high observation point density over a wide range. The marine organism observation device according to the present example embodiment is free of a restriction of supplied power and observation data recording medium capacity, and can transmit all pieces of observable information to the land.

Furthermore, since all pieces of measurable sound data can be collected from a large number of observation points that are displaced little by little, information about a kind of organism and an action thereof can be acquired in detail by subjecting the abundant sound data to information processing such as pattern recognition and sound source separation. Since the marine organism observation device according to the present example embodiment does not require an electronic circuit in an underwater acoustic sensor unit and therefore does not break down easily, it is easy to maintain long-term implementation, and long-term fixed-point observation is eased.

Note that, in the example described above, a case where an optical cable including an optical fiber is a submarine cable has been described. However, an optical cable may be an optical cable installed in a sea other than a bay or an ocean such as Caspian Sea, a lake, a river, or a canal. In this case, the organism observation device according to the present example embodiment is an aquatic organism observation device that observes an aquatic organism living in water of a sea, a lake, a river, or a canal.

Figure 9:
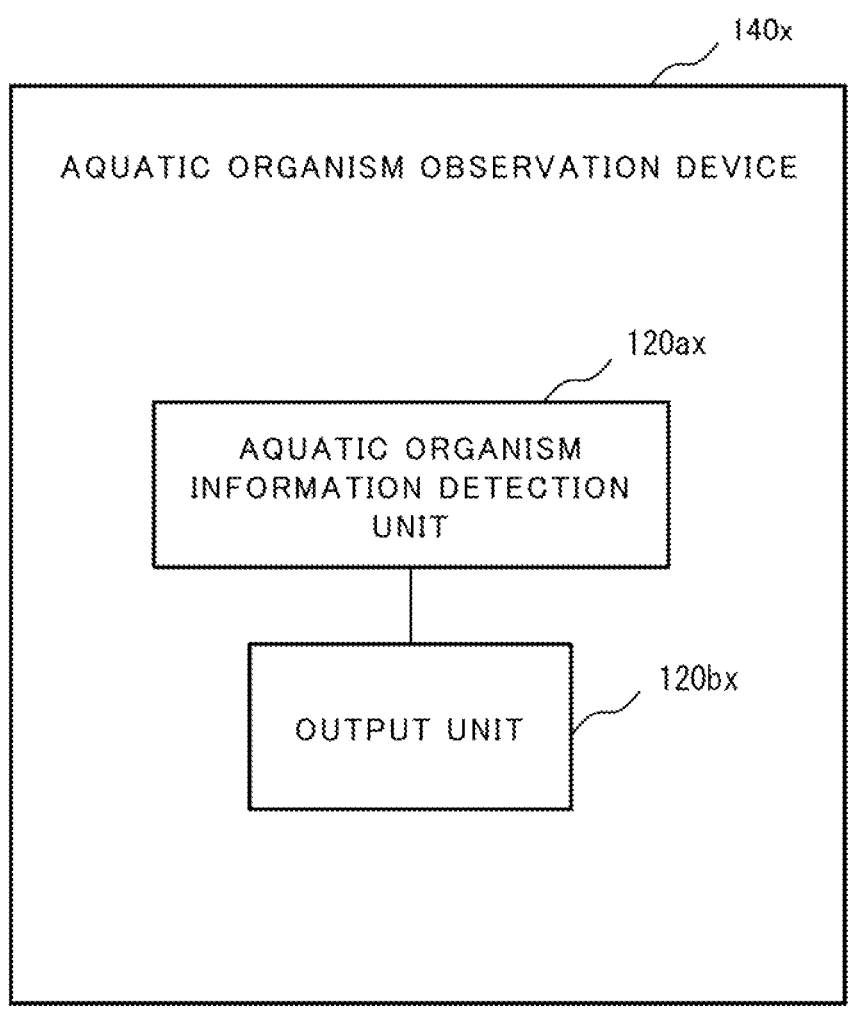
FIG. 9 is a block diagram representing a minimum configuration of an aquatic organism observation device according to an example embodiment.

FIG. 9 is a block diagram representing a configuration of an aquatic organism observation device 140*x* being a minimum configuration of an aquatic organism observation device according to an example embodiment. The aquatic organism observation device 140*x* includes an aquatic organism information detection unit 120*ax*, and an output unit 120*bx*.

The aquatic organism information detection unit 120*ax* detects, from sound data, being acquired by an optical fiber installed in water or at a bottom of water, relating to a sound at each position of the optical fiber, a sound emitted by an aquatic organism at a time and a place at which the sound data have been acquired. The output unit 120*bx* outputs the aquatic organism information.

The aquatic organism observation device 140*x* is able to observe an aquatic organism by utilizing an optical fiber of an optical cable laid in water or at a bottom of water. Thus, there is no need to newly install recording equipment in water or tow recording equipment over a wide range of a sea area for a long period. To that end, the aquatic organism observation device 140*x* lessens effort of observation by a sound of an aquatic organism, and enables long-term fixed-point observation over a wide range.

Thus, the aquatic organism observation device 140*x* provides, by the configuration described above, the advantageous effect described in a paragraph of [Advantageous Effects of Invention].

While each example embodiment of the present invention has been described above, the present invention is not limited to the example embodiment described above, and a further modification, replacement, and adjustment can be made without departing from a basic technical idea of the present invention. For example, a configuration of an element illustrated in each drawing is one example for helping understand the present invention, and the present invention is not limited to the configuration illustrated in each of the drawings.

Some or all of the above-described example embodiments can also be described as, but are not limited to, the following supplementary notes.

(Supplementary Note 1)

An aquatic organism observation device including:
an aquatic organism information detection unit that detects, from sound data being acquired by an optical fiber installed in water or at a bottom of water and being data relating to a sound at each position of the optical fiber, a sound emitted by an aquatic organism at a time and a position at which the sound data have been acquired; and
an output unit that outputs information representing the sound emitted by the aquatic organism.

(Supplementary Note 2)

The aquatic organism observation device according to supplementary note 1, wherein the aquatic organism information detection unit classifies a kind of the aquatic organism or an action of the aquatic organism, from the information representing the sound emitted by the aquatic organism.

(Supplementary Note 3)

The aquatic organism observation device according to supplementary note 2, wherein the aquatic organism information detection unit performs the classification by analogical determination in light of a previously held classification condition with one or more characteristics as a key.

(Supplementary Note 4)

The aquatic organism observation device according to supplementary note 3, wherein the characteristic being used for the classification includes at least one of a frequency, a temporal change of a frequency, and a temporal change of an intensity envelope of the sound data.

(Supplementary Note 5)

The aquatic organism observation device according to any one of supplementary notes 2 to 4, wherein the aquatic organism information detection unit performs the classification after dividing the sound data into a plurality of frequency bands.

(Supplementary Note 6)

The aquatic organism observation device according to any one of supplementary notes 1 to 5, wherein the aquatic organism information detection unit identifies the sound data of the sound emitted from a same sound source, among pieces of the sound data acquired at a plurality of the positions of the optical fiber.

(Supplementary Note 7)

The aquatic organism observation device according to any one of supplementary notes 1 to 6, wherein the aquatic organism information detection unit performs spatial separation of the sound source by use of, as a sensor array output, the sound data of the sound detected at a plurality of the positions of the optical fiber.

(Supplementary Note 8)

The aquatic organism observation device according to supplementary note 6 or 7, wherein the aquatic organism information detection unit tracks the moving sound source by applying to a movement model.

(Supplementary Note 9)

The aquatic organism observation device according to any one of supplementary notes 1 to 8, wherein the optical fiber is provided in an optical cable.

(Supplementary Note 10)

The aquatic organism observation device according to supplementary note 9, wherein the aquatic organism information detection unit identifies a sound emitted from a same sound source, among sounds detected at a plurality of positions of the optical fiber.

(Supplementary Note 11)

The aquatic organism observation device according to supplementary note 10, wherein at least one of an acquisition processing unit that acquires the sound data by the optical fiber and sends the acquired sound data to the aquatic organism information detection unit, and the aquatic organism information detection unit performs processing of reducing, based on information about an installation method concerning installation of the optical cable, an influence on sensitivity due to a difference of the installation method, from the sound data.

(Supplementary Note 12)

The aquatic organism observation device according to any one of supplementary notes 9 to 11, wherein at least one of an acquisition processing unit that acquires the sound data by the optical fiber and sends the acquired sound data to the aquatic organism information detection unit, and the aquatic organism information detection unit performs processing of reducing, based on information about a kind of the optical cable, an influence on sensitivity due to a difference of the kind, from the sound data.

(Supplementary Note 13)

The aquatic organism observation device according to any one of supplementary notes 9 to 12, wherein at least one of an acquisition processing unit that acquires the sound data by the optical fiber and sends the acquired sound data to the aquatic organism information detection unit, and the aquatic organism information detection unit performs processing of acquiring, by use of a reference sound transmitting in a wide range of the optical cable, a degree of a difference due to the position where the sound data have been acquired, and reducing, based on information about the degree of the difference, a difference in sensitivity due to the position where the sound data have been acquired, from the sound data, or selects a position where the sound data are acquired.

(Supplementary Note 14)

The aquatic organism observation device according to any one of supplementary notes 9 to 13, wherein the optical cable is shared with another use by separating an optical fiber core wire, or separating wavelengths.

(Supplementary Note 15)

The aquatic organism observation device according to any one of supplementary notes 1 to 14, wherein acquisition of the sound data is performed by optical fiber sensing.

(Supplementary Note 16)

The aquatic organism observation device according to supplementary note 15, wherein the optical fiber sensing is distributed acoustic sensing.

(Supplementary Note 17)

The aquatic organism observation device according to any one of supplementary notes 1 to 16, wherein the water is sea, and the aquatic organism is a marine organism.

(Supplementary Note 18)

The aquatic organism observation device according to any one of supplementary notes 1 to 17, further including an acquisition processing unit that acquires the sound data by the optical fiber and sends the acquired sound data to the aquatic organism information detection unit.

(Supplementary Note 19)

An aquatic organism observation system including: the aquatic organism observation device according to any one of supplementary notes 1 to 18; and the optical fiber.

(Supplementary Note 20)

An aquatic organism observation method including:
  detecting, from sound data being acquired by an optical fiber installed in water or at a bottom of water and being data relating to a sound at a predetermined position of the optical fiber, a sound emitted by an aquatic organism at a time and a place at which the sound data have been acquired; and
  outputting information representing the sound emitted by the aquatic organism.

(Supplementary Note 21)

An aquatic organism observation program causing a computer to execute:
  processing of detecting, from sound data being acquired by an optical fiber installed in water or at a bottom of water and being data relating to a sound at a predetermined position of the optical fiber, a sound emitted by an aquatic organism at a time and a place at which the sound data have been acquired; and
  processing of outputting the sound emitted by the aquatic organism.

(Supplementary Note 22)

The aquatic organism observation device according to supplementary note 1, wherein the aquatic organism information detection unit determines kinds of a plurality of the aquatic organisms.

(Supplementary Note 23)

The aquatic organism observation device according to supplementary note 1, wherein at least one of an acquisition processing unit that acquires the sound data by the optical fiber and sends the acquired sound data to the aquatic organism information detection unit, and the aquatic organism information detection unit performs correction of the sound data by reference sound data being data relating to a separately acquired sound.

(Supplementary Note 24)

The aquatic organism observation device according to supplementary note 9, wherein the optical cable is an optical cable for optical communication.

(Supplementary Note 25)

The aquatic organism observation device according to supplementary note 1, wherein the aquatic organism information detection unit associates, with a geographic coordinate, the position where the sound data have been acquired.

(Supplementary Note 26)

The aquatic organism observation device according to supplementary note 2, wherein the aquatic organism information detection unit performs the classification after excluding a part that does not include a sound of a detection target.

Herein, the optical fiber in the supplementary notes is, for example, the optical fiber 200 in FIG. 1 or the optical fiber provided in the submarine cable 920 in FIG. 2. The aquatic organism information detection unit is, for example, a part, of the marine organism information acquisition unit 120 in FIG. 1, that detects the aquatic organism detection information from the sound data.

The output unit is, for example, a part of the marine organism information acquisition unit 120 that outputs the organism sound detection information. The aquatic organism observation device is, for example, the marine organism observation device 140 in FIG. 1.

The above-described case where "the aquatic organism detection information is acquired by the frequency information" is, for example, the case represented in the first specific example of the classification operation of the organism sound classification unit 124. The above-described case where "the aquatic organism detection information is acquired by the temporal interval information" is, for example, the case represented in the second specific example of the classification operation of the organism sound classification unit 124. The above-described case where "the aquatic organism detection information is acquired by the temporal intensity change information" is, for example, the case represented in the third or fourth specific example of the classification operation of the organism sound classification unit 124.

The optical cable is, for example, the submarine cable 920 in FIG. 2. The acquisition processing unit is, for example, the acquisition processing unit 101 in FIG. 1. The aquatic organism observation system is, for example, the marine organism observation system 300 in FIG. 1. The computer is, for example, the computer provided in the acquisition processing unit 101 and the marine organism information acquisition unit 120 in FIG. 1. The aquatic organism observation program is a program that causes the computer to execute processing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-136125, filed on Aug. 12, 2020, the disclosure of which is incorporated herein in its entirety by reference.

REFERENCE SIGNS LIST

100 Interrogator
101 Acquisition processing unit
103 Light source unit
104 Modulation unit
105 Detection unit
120 Marine organism information acquisition unit
120ax Aquatic organism detection unit
120bx Output unit
121 Processing unit
122 Preprocessing unit
123 Sound extraction unit
124 Organism sound classification unit
125 Output processing unit
131 Storage unit
132 RAW data storage unit
133 Cable route information storage unit
134 Extracted data storage unit
135 Classification condition storage unit
136 Organism sound detection information storage unit
140 Marine organism observation device
140x Aquatic organism observation device
200, 201, 202 Optical fiber
211 Optical coupler
300 Marine organism observation system
920 Submarine cable

What is claimed is:

1. An aquatic organism observation device comprising:
an aquatic organism information detector comprising a processor configured to execute a program, and a storage storing information about a manufacturing or construction of an optical fiber provided in an optical cable,
wherein, by executing the program, the aquatic organism information detector is configured to:
detect, from sound data being acquired by the optical fiber that is installed in water or at a bottom of water and being data relating to a sound at each position of the optical fiber, a sound emitted by an aquatic organism at a time and a position at which the sound data have been acquired,
identify a sound emitted from a same sound source, among sounds detected at a plurality of positions of the optical fiber, and
perform processing of correcting, based on information about an installation state of the optical cable stored in the storage, the sound data to reduce an influence of a sensitivity due to a difference of the installation state; and
an output circuit configured to output information representing the sound emitted by the aquatic organism.

2. The aquatic organism observation device according to claim 1, wherein the aquatic organism information detector is further configured to classify a kind of the aquatic organism or an action of the aquatic organism, from the information representing the sound emitted by the aquatic organism.

3. The aquatic organism observation device according to claim 2, wherein the aquatic organism information detector is further configured to perform the classification by analogical determination in light of a previously held classification condition with one or more characteristics as a key.

4. The aquatic organism observation device according to claim 3, wherein the characteristic being used for the classification includes at least one of a frequency, a temporal change of a frequency, and a temporal change of an intensity envelope of the sound data.

5. The aquatic organism observation device according to claim 2, wherein the aquatic organism information detector is further configured to perform the classification after dividing the sound data into a plurality of frequency bands.

6. The aquatic organism observation device according to claim 1, wherein the aquatic organism information detector is further configured to identify the sound data of the sound emitted from a same sound source, among pieces of the sound data acquired at a plurality of the positions of the optical fiber.

7. The aquatic organism observation device according to claim 6, wherein the aquatic organism information detector is further configured to perform spatial separation of the sound source by use of, as a sensor array output, the sound data of the sound detected at a plurality of the positions of the optical fiber.

8. The aquatic organism observation device according to claim 6, wherein the aquatic organism information detector is further configured to track the moving sound source by applying to a movement model.

9. The aquatic organism observation device according to claim 1, wherein the aquatic organism information detector is further configured to perform processing of correcting, based on information about a kind of the optical cable stored in the storage, the sound data to reduce an influence of a sensitivity due to a difference of the kind.

10. The aquatic organism observation device according to claim 1, wherein the aquatic organism information detector is further configured to perform processing of:
    acquiring, by use of a reference sound transmitting in a wide range of the optical cable, a degree of a difference of sound data due to the position where the sound data have been acquired, and
    correcting, based on information about the degree of the difference, the sound data to reduce a difference of a sensitivity due to the position where the sound data have been acquired.

11. The aquatic organism observation device according to claim 1, wherein the optical cable is shared with another use by separating an optical fiber core wire, or separating wavelengths.

12. The aquatic organism observation device according to claim 1, wherein acquisition of the sound data is performed by optical fiber sensing.

13. The aquatic organism observation device according to claim 12, wherein the optical fiber sensing is distributed acoustic sensing.

14. The aquatic organism observation device according to claim 1, wherein the water is sea, and the aquatic organism is a marine organism.

15. The aquatic organism observation device according to claim 1, further comprising acquisition processor configured to acquire the sound data by the optical fiber and sending the acquired sound data to the aquatic organism information detector.

16. An aquatic organism observation system comprising: the aquatic organism observation device according to claim 1; and the optical fiber.

17. An aquatic organism observation method executed by an aquatic organism observation device including a storage storing information about a manufacturing or construction of an optical fiber provided in an optical cable, the method comprising:
    detecting, from sound data being acquired by an optical fiber provided in the optical cable that is installed in water or at a bottom of water and being data relating to a sound at a predetermined position of the optical fiber, a sound emitted by an aquatic organism at a time and a place at which the sound data have been acquired;
    identifying a sound emitted from a same sound source, among sounds detected at a plurality of positions of the optical fiber;
    performing processing of correcting, based on information about an installation state of the optical cable stored in the storage, the sound data to reduce an influence of a sensitivity due to a difference of the installation state; and
    outputting information representing the sound emitted by the aquatic organism.

* * * * *